United States Patent [19]

Rinn

[11] Patent Number: 4,597,182
[45] Date of Patent: Jul. 1, 1986

[54] GANTRY-TYPE JIG

[76] Inventor: Jurgen Rinn, Am Weidacker 42, D-6301 Launsbach, Fed. Rep. of Germany

[21] Appl. No.: 714,926

[22] Filed: Mar. 22, 1985

[30] Foreign Application Priority Data

Mar. 23, 1984 [DE] Fed. Rep. of Germany ....... 3410672

[51] Int. Cl.$^4$ .............................................. G01B 5/02
[52] U.S. Cl. ..................................... 33/1 M; 33/503; 33/559
[58] Field of Search ................ 33/1 M, 503, 504, 505, 33/556, 558, 559

[56] References Cited

U.S. PATENT DOCUMENTS 3,774,311 11/1973 Stemple ................................ 33/1 M
3,840,993 10/1974 Shelton ................................ 33/1 M
4,207,680 6/1980 Bell et al. ............................. 33/559
4,525,930 7/1985 Bury ..................................... 33/1 M

FOREIGN PATENT DOCUMENTS 2744687 4/1978 Fed. Rep. of Germany ....... 33/1 M

Primary Examiner—Willis Little

[57] ABSTRACT

A gantry-type jig having two longitudinal beams and a traveling cross-rail, each composed of a load-bearing element and a positioning element. The varying load as governed by the position of a trolley is taken up fully, or to the major part, by the load-bearing elements. The positioning elements form a constant reference basis for measuring the deflection of the load-bearing elements by means of transducers. On the basis of the deflection measured, correcting values are established which are employed to change the level of the ram of the trolley or the level of the cross-rail.

9 Claims, 4 Drawing Figures

GANTRY-TYPE JIG

BACKGROUND OF THE INVENTION

This invention relates to a gantry-type jig by means of which tools or workpieces can be moved and/or positioned with a high degree of accuracy along very accurate, programmed paths within the space covered by the gantry-type jig. For this purpose, a trolley is provided to carry the tool or the workpiece, with the trolley travelling on a cross-rail. The cross-rail comprises a load-bearing element and a positioning element. The load-bearing element takes up the full, or at least the major part of the load, whereas the positioning element is subjected to no load, or at most to only a minor load, and governs the accuracy in the vertical direction.

Gantry-type jigs fulfilling requirements of this kind are commonly known, for instance for measuring purposes. In order to obtain the required degree of accuracy, the stationary frame parts as well as the traveling cross-rail are of such sturdy construction that deflection resulting from the traveling load is far smaller than is required by the tolerances of accuracy. Therefore, the construction has to be relatively heavy and involves great material expenditure. The use of light-weight materials having a high elastic modulus, for instance chemical-fiber reinforced plastics, are mostly generally not used due to the high prices of these materials.

A measuring apparatus in the form of a jig is already known from West German Offenlegungsschrift No. 27 44 687, which discloses a jig traveling on a platform. The cross-rail of the jig comprises a positioning element guiding the trolley and a load-bearing element supporting the weight of the trolley. The degree of accuracy of the measuring apparatus already known depends on how uniformly the weight of the trolley is supported on the load-bearing element. In this respect it has to be taken into account that the trolley is supported via a spring and that the spring is automatically less tensioned with the trolley in a central position due to the largest deflection of the load-bearing element that occurs in this case than with the trolley in the vicinity of the longitudinal beams of the frame. Hence, the positioning element is subjected to differing bending forces, resulting in inaccuracies. Apart from this, the measuring apparatus according to German OS No. 27 44 687 is not of the gantry-type.

SUMMARY OF THE INVENTION

The primary object of the present invention is the provision of a gantry-type jig such that its weight can be kept at a minimum even without the use of expensive special materials, with the gantry-type jig having at the same time a very high degree of path and positioning accuracy.

This object is established according to the invention in that the longitudinal beams each comprise one load-bearing element and one positioning element and in that travelling transducers which measure the deviations in the vertical direction resulting from the deflection of the load-bearing element, in this way generating level correction values are provided.

The construction of the gantry-type jig of the present invention insures that for the longitudinal motion as well as for the transverse motion the variable load is continuously taken up by component parts and guides that do not govern the position of the tool in the vertical direction. Therefore accuracy is not affected even by major deflection of the load-bearing elements taking up the weight. The construction of the gantry-type jig of this invention can be of substantially less sturdy design than that of the gantry-type jigs hitherto known with an equally high degree of path and positioning accuracy. In the gantry-type jig according to the invention the positioning elements form a constant reference basis for measuring the deflection of the load-bearing elements.

Inaccuracies resulting from deflection of the load-bearing elements can be corrected with special ease when the positioning elements governing the accuracy in the vertical direction merely function as guides on which the transducers generating the level correction values can travel.

It is furthermore favorable when a computer calculates the resulting total level deviation of the trolley, with the this value being corrected by a corresponding movement of the ram in the trolley.

In this embodiment the deviation of the guide of the cross-rail from the ideal horizontal zero line resulting from the deflection of the load-bearing elements and from the consequent displacement in level at the point of the cross-rail where the trolley is located is determined by a computing routine. The deflection of the cross-rail at the location of the trolley measured by a further transducer and by the guide of the cross-rail is added to this deviation in level. This total value of the deviation in the vertical direction is corrected by the movement of the ram of the trolley, with the movement also being numerically controlled.

An alternative embodiment provides for correcting elements located at both sides of the cross-rail as well as at the trolley, with the former being controlled by the level correction values established by the transducers in such a manner that the level of both ends of the cross-rail and the level of the trolley are always kept constant. Unlike the first embodiment, no deviations from a reference position (given by the guides) are measured and evaluated in a computing routine in this embodiment, but it constitutes a zeroing adjustment without the use of a computer.

The deflection of the cross-rail can be measured with special ease when the trolley is supported on the load-bearing element of the cross-rail via correcting elements and when for purposes of determining the deflection of the load-bearing element of the cross-rail one or several transducers corresponding to the correcting elements are provided between the trolley and the positioning element of the cross-rail.

For the embodiment described hereinbefore one has to consider, however, that only the deviation in level resulting from the deflection is compensated for when only one transducer is used. When the trolley is located in the vicinity of one of the longitudinal beams, this automatically results in an inclination of the trolley due to the deflection. This can easily be remedied according to a further embodiment in that provision is made of a transducer located at the trolley on each side of the ram for measuring the deflection of the load-bearing element and in that each transducer controls the correcting element of the trolley located on the same side.

A simple possibility of the kind mentioned last, that is to avoid deviations in angle and in level of the ram, consists in the trolley being guided on the positioning element of the cross-rail and being supported on the load-bearing element of the cross-rail via hydraulic supports.

This principle of load-relief can of course also be applied to the longitudinal beams. Hence it is favorable for the positioning element of the cross-rail to be guided on the two positioning elements of the longitudinal beams and to be supported on the load-bearing elements of the longitudinal beams via hydraulic supports.

BRIEF DESCRIPTION OF THE DRAWINGS

The invention will be better understood, and objects other than those set forth above, will become apparent, when consideration is given to the following detailed description thereof. Such description makes reference to the annexed drawing wherein.

DETAILED DESCRIPTION OF THE PREFERRED EMBODIMENTS

Figure 1:
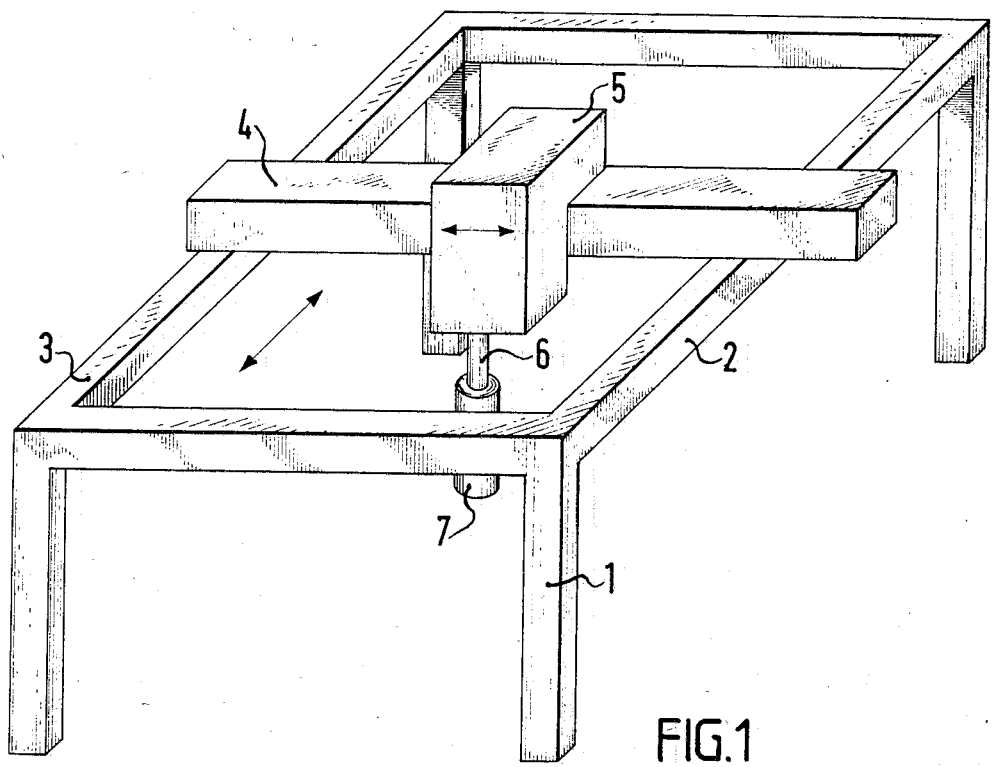
FIG. 1 is a perspective view of a prior art gantry-type jig.

The gantry-type jig illustrated in FIG. 1 has a frame 1 with two longitudinal beams 2 and 3, with a cross-rail 4 being capable of traveling longitudinally on the beams. The cross-rail 4 supports a trolley 5 that accommodates a ram 6 holding, for instance, a tool 7. The trolley 5 can travel on the cross-rail 4.

For such a gantry-type jig deflection of the longitudinal beams 2 and 3 and of the cross-rail 4 is inevitable. This deflection is governed by the location of the cross-rail 4 and of the trolley 5 and changes the level of the ram 6. According to the invention the ram 6 is kept at a constant level even with differing deflections of the cross-rail 4 and of the longitudinal beams 2 and 3. For explanation of the characteristic features of the invention FIG. 2 will now first be referred to.

Figure 2:
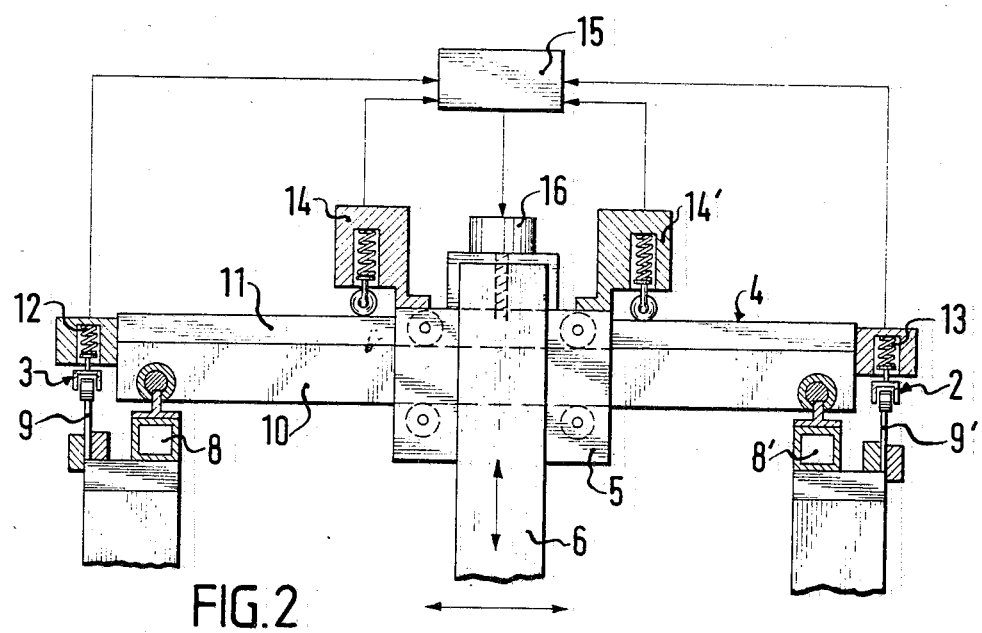
FIG. 2 is a vertical sectional view of a first embodiment of a gantry-type jig according to the invention.

FIG. 2 reveals that the longitudinal beams 2 and 3 each comprise a load-bearing element 8 and 8' and a positioning element 9 and 9'. In analogy, the cross-rail 4 comprises a load-bearing element 10 and a positioning element 11. The positioning elements 9 and 9' and 11 function as guides which are not subjected to the load of the cross-rail 4 or that of the trolley 5 and which, contrary to the load-bearing elements 8 and 8' and 10, consequently are not subject to deflection.

One transducer 12 or 13 is arranged above each of the positioning elements 9 and 9' on the cross-rail 4. These transducers 12 and 13 continuously determine the distance from the positioning elements 9 and 9'. If the cross-rail 4 moves, for instance, from the front end of the frame into a central position, this distance decreases as a function of the increasing deflection of the longitudinal beams 2 and 3.

Two further transducers 14 and 14' are arranged on the trolley 5, with the former moving along the positioning element 11. Since the trolley 5 is supported on the load-bearing element 10 only, the distance between the transducers 14 and 14' and the positioning element 11 decreases with the trolley 5 moving towards the center of the cross-rail 4.

The values measured by the transducers 12 and 13 as well as those measured by the transducers 14 and 14' are fed into a computer 15 which establishes correction values on the basis of a computing routine, with the correction values controlling a servo-motor 16 which lifts the ram 6 corresponding to the displacement in level resulting from the deflection.

Figure 3:
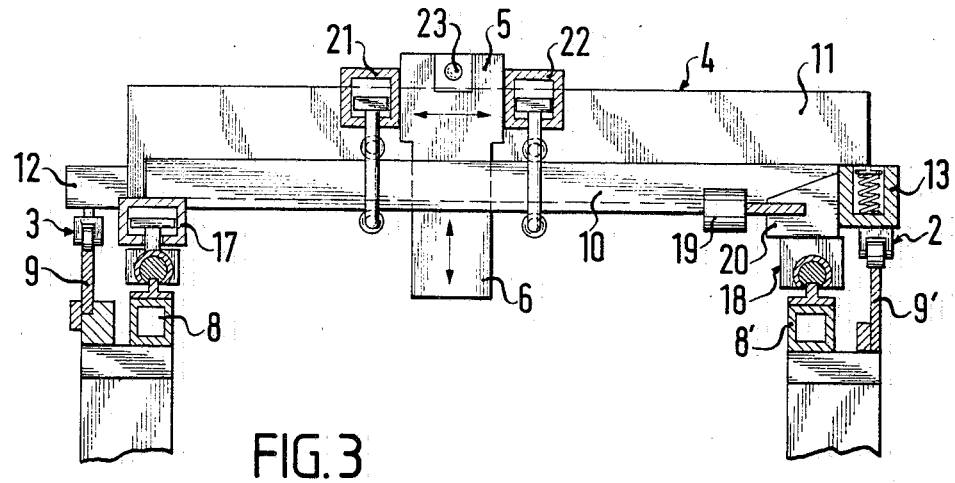
FIG. 3 is a vertical cross-sectional view of a second embodiment of a gantry-type jig according to the invention.

The embodiment as shown in FIG. 3 basically differs from the embodiment described before in that both ends of the load-bearing element 10 of the cross-rail 4 are supported on the load-bearing elements 8 and 8' of the longitudinal beams 2 and 3 through provision of one intermediate correcting element 17 or 18. The left-hand part of the drawing shows a correcting element in the form of a hydraulic correcting element, whereas in the right-hand part of the drawing a servo-motor 19 with an adjusting wedge 20 is illustrated. The trolley 5, too, is supported on the load-bearing element 10 via two correcting elements 21 and 22. A transducer 23 is in turn located at the trolley 5 and measures the distance from the positioning element 11. As with the embodiment described before, the transducers 12 and 13 are provided at the ends of the cross-rail 4, with said transducers determining the distance between the cross-rail 4 and the positioning elements 9 and 9'. In case this distance increases, the correcting elements 17 and 18 are controlled accordingly, resulting in both ends of the cross-rail 4 always being kept at a constant level. The deflection of the load bearing element 10 of the cross-rail 4 is registered by the transducer 23 and results in the correcting elements 21 and 22 being subjected to pressure and in the trolley 5 thereby being lifted relative to the load-bearing element 10 in case the latter is deflected.

Alternatively, two transducers could be provided, one at each side of the ram 6, instead of the one transducer 23 positioned on the center line of said ram 6. In this embodiment, the transducer to the left can control the left correcting element 21, and the transducer to the right can control the right correcting element 22. In this way, it is ensured that the ram 6 of the trolley 5 is always in a vertical position, regardless of deflection.

In analogy to the above mentioned embodiment featuring two transducers and two correcting elements located at the trolley, a further modification provides for the provision of two transducers and two correcting elements at each end of the cross-rail, in order to avoid deviations in angle of the ram in a vertical direction in relation to the plane illustrated in FIG. 3.

Figure 4:
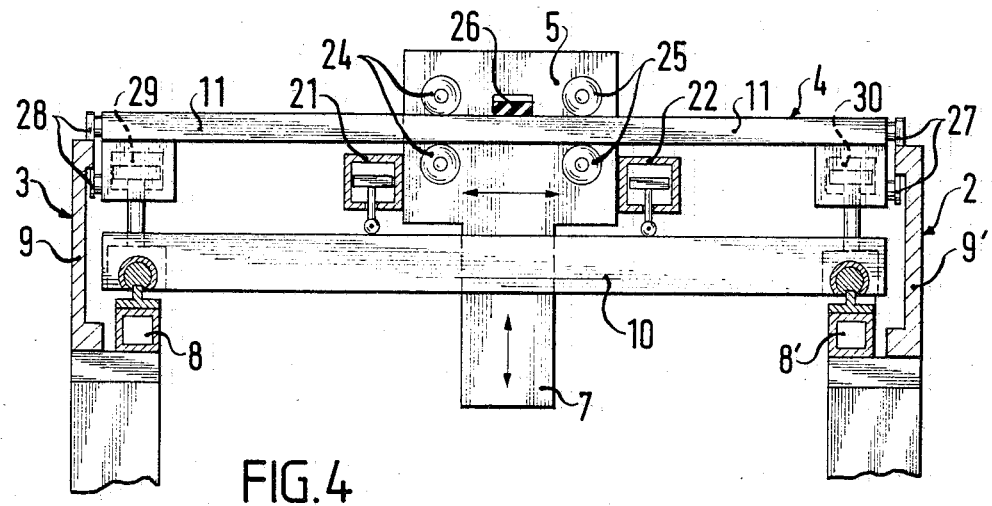
FIG. 4 is a vertical cross-sectional view of a third embodiment of a gantry-type jig according to the invention.

In the embodiment of FIG. 4, the trolley 5 is positively guided on the positioning element 11 of the cross-rail 4 by means of pairs of rollers 24 and 25. So as to avoid deflections of the positioning element 11 due to the weight of the trolley 5, the latter is supported on the load-bearing element 10 via the correcting elements 21 and 22, as is the case in the embodiment described before. A pressure sensor 26 located between the trolley 5 and the positioning element 11 continuously measures the load to which the positioning element is subjected and controls the correcting elements 21 and 22 in a manner that the positioning element 11 is subjected to minor load only, hence ensuring that no deflection of said positioning element occurs.

Both ends of the positioning element 11 are also positively supported on the positioning elements 9 and 9' of the longitudinal beams 2 and 3 by means of pairs of rollers 27 and 28. This would, of course, also result in deflection of both positioning elements in case the latter were not relieved from load in the same way as is the positioning element 11. In order to bring about this load-relief, correcting element 29 and 30 are provided at both ends of both positioning elements, with the former also being controlled by pressure sensors not illustrated in the drawing. The positioning element 11 is supported on load-bearing elements 8 and 8' of the longitudinal beams 2 and 3 via said correcting elements.

It should be apparent from the foregoing detailed description, that the objects set forth at the outset to the specification have been successfully achieved. Moreover, while there is shown and described present preferred embodiments of the invention, it is to be distinctly understood that the invention is not limited thereto, but may be otherwise variously embodied and practiced within the scope of the following claims.

What is claimed is:

1. A gantry-type jig for moving or positioning tools or workpieces with a high degree of accuracy along very accurate, programmed paths within the space covered by the gantry-type jig, comprising a pair of spaced-apart parallel longitudinal beams; a cross-rail mounted on said beams for longitudinal movement; and a trolley mounted on said cross-rail for transverse movement, said trolley carrying said tool; said beams and said cross-rail each comprising a load-bearing element and a positioning element, said load-bearing elements taking up substantially the full load and being subject to deflection resulting in deviations in a vertical direction, and the positioning elements being subjected to essentially no load and governing the accuracy in the vertical direction; said gantry-type jig further comprising transducers which measure the deviations in the vertical direction resulting from deflection of said load-bearing elements to generate level correction signals, and means to adjust the vertical position of said tool responsive to said signals.

2. A gantry-type jig according to claim 1, wherein the positioning elements which govern the accuracy in the vertical direction merely function as guides and the transducers which generate the level correction signals travel on said guides.

3. A gantry-type jig according to claim 1, further comprising a vertically movable tool-holding ram depending from said trolley and signal processing means to calculate the resulting total level deviation of the trolley from the level correction signals and correcting the vertical position of the tool by causing a corresponding movement of the ram.

4. A gantry-type jig according to claim 1, further comprising correcting elements disposed at both ends of the cross-rail and the trolley which are actuated responsive to the level correction signals by the transducers such that the cross-rail and the trolley are always kept in a constant level.

5. A gantry-type jig according to claim 4, wherein the trolley is supported on the load-bearing element of the cross-rail through correcting elements and, for purposes of determining the degree of deflection of the load-bearing element of the cross-rail, at least one transducer operatively connected to the correcting elements is provided between the trolley and the positioning element of the cross-rail.

6. A gantry-type jig according to claim 4, wherein a transducer is arranged on each side of the ram between the trolley and the positioning element of the cross-rail, with each said transducer controlling a correcting element of the trolley positioned on the same side.

7. A gantry-type jig according to claim 4, wherein the trolley is guided on the positioning element of the cross-rail and supported on the load-bearing element of the cross-rail via hydraulic supports.

8. A gantry-type jig according to claim 4, wherein the positioning element of the cross-rail is guided on the two positioning elements of the longitudinal beams and supported on the load-bearing elements of the longitudinal beams via hydraulic supports.

9. A gantry-type jig according to claim 7, wherein the positioning element of the cross-rail is guided on the two positioning elements of the longitudinal beams and supported on the load-bearing elements of the longitudinal beams via hydraulic supports.

* * * * *